US012757918B2

(12) United States Patent
Yanagisawa

(10) Patent No.: US 12,757,918 B2
(45) Date of Patent: Oct. 13, 2026

(54) VEGETABLE-PROTEIN-CONTAINING LIQUID FOOD PRODUCT AND METHOD FOR PRODUCING SAME

(71) Applicant: FUJI OIL CO., LTD., Osaka (JP)

(72) Inventor: Masanobu Yanagisawa, Osaka (JP)

(73) Assignee: FUJI OIL CO., LTD., Osaka (JP)

( * ) Notice: Subject to any disclaimer, the term of this patent is extended or adjusted under 35 U.S.C. 154(b) by 248 days.

(21) Appl. No.: 18/282,792

(22) PCT Filed: Mar. 31, 2022

(86) PCT No.: PCT/JP2022/016470
§ 371 (c)(1),
(2) Date: Sep. 19, 2023

(87) PCT Pub. No.: WO2022/211013
PCT Pub. Date: Oct. 6, 2022

(65) Prior Publication Data

US 2024/0156139 A1 May 16, 2024

(30) Foreign Application Priority Data

Mar. 31, 2021 (JP) ................................ 2021-059270

(51) Int. Cl.
*A23L 23/00* (2016.01)
*A23B 2/40* (2025.01)
*A23L 29/00* (2016.01)
*A23L 33/185* (2016.01)

(52) U.S. Cl.
CPC ................ *A23L 23/00* (2016.08); *A23B 2/40* (2025.01); *A23L 29/015* (2016.08); *A23L 29/04* (2016.08); *A23L 33/185* (2016.08)

(58) Field of Classification Search
CPC ... A23J 3/14; A23J 1/006; A23L 11/60; A23L 11/65
See application file for complete search history.

(56) References Cited

U.S. PATENT DOCUMENTS

| | | | |
|---|---|---|---|
| 2013/0071541 | A1 | 3/2013 | Maebuchi |
| 2018/0184678 | A1 | 7/2018 | Motoyama et al. |

FOREIGN PATENT DOCUMENTS

| | | |
|---|---|---|
| CN | 1691895 | 11/2005 |
| CN | 1761398 | 4/2006 |
| CN | 1905802 | 1/2007 |
| CN | 102905560 | 1/2013 |
| CN | 106604643 | 4/2017 |
| JP | 85621570 | 2/1981 |
| JP | S5941709 | 10/1984 |
| JP | 659227261 | 12/1984 |
| JP | 2011103842 | 6/2011 |
| JP | 2014003960 | 1/2014 |
| JP | 5528779 | 6/2014 |
| JP | 2015033344 | 2/2015 |
| JP | 2018050600 | 4/2018 |
| JP | 2019054762 | 4/2019 |
| WO | 2008105352 | 9/2008 |
| WO | 2011148889 | 12/2011 |
| WO | 2017010513 | 1/2017 |

OTHER PUBLICATIONS

Shirreffs "The optimal sports drink", Schweizerische Zeitschrift für Sportmedizin und Sporttraumatologie 51 (1), 25-29, 2003 (Year: 2003).*
"Search Report of Europe Counterpart Application", issued on Aug. 27, 2024, p. 1-p. 8.
"International Search Report (Form PCT/ISA/210) of PCT/JP2022/016470", mailed on Jun. 21, 2022, with English translation thereof, pp. 1-4.
"Office Action of Japan Counterpart Application", issued on May 30, 2023, with English translation thereof, pp. 1-7.
Dina Cheney, "Making Your Own Soy Milk is (Much) Easier Than You Think", Food52, Inc., Jan. 20, 2016, pp. 1-14.
Malcolm C. Bourne et al., "Effect of Sodium Alkalis and Salts on pH and Flavor of Soymilk", Journal of Food Science, vol. 41, Jan. 1976, pp. 62-66.
Lili Zhang et al., "New insights into the NaCl impact on emulsifying properties of globular proteins", Food Hydrocolloids, Nov. 10, 2021, pp. 1-15, vol. 124.
Hua-Neng Xu et al., "Salting-out and salting-in: competitive effects of salt on the aggregation behavior of soy protein particles and their emulsifying properties", Soft Matter, Jun. 12, 2015, pp. 5926-5932, vol. 11, No. 29.

* cited by examiner

*Primary Examiner* — Michele L Jacobson
(74) *Attorney, Agent, or Firm* — JCIPRNET

(57) ABSTRACT

A vegetable-protein-containing liquid food product is provided. The vegetable-protein-containing liquid food product excellent in salt resistance can be produced by mixing raw materials containing a vegetable protein, a salt-containing seasoning, and one or more emulsifiers selected from the group consisting of a polyglycerin fatty acid ester having an HLB of 7 or greater, a constituent fatty acid having 14 to 18 carbons, and a polymerization degree of 5 or greater, a polyglycerin fatty acid ester having an HLB of 12 or greater, a constituent fatty acid having 10 to 12 carbons, and a polymerization degree of 10 or greater, a sucrose fatty acid ester having an HLB of 5 or greater and a constituent fatty acid having 14 to 18 carbons, and a sorbitan fatty acid ester having an HLB of 15 or greater and a constituent fatty acid having 12 to 18 carbons, followed by heat sterilization.

3 Claims, No Drawings

VEGETABLE-PROTEIN-CONTAINING LIQUID FOOD PRODUCT AND METHOD FOR PRODUCING SAME

CROSS-REFERENCE TO RELATED APPLICATION

This application is a 371 application of the International PCT application serial no. PCT/JP2022/016470, filed on Mar. 31, 2022, which claims the priority benefit of Japan Patent Application No. 2021-059270, filed on Mar. 31, 2021. The entirety of each of the above-mentioned patent applications is hereby incorporated by reference herein and made a part of this specification.

TECHNICAL FIELD

The present invention relates to a vegetable-protein-containing liquid food product and a method for producing the same.

BACKGROUND ART

In recent years, from the viewpoint of climate change typified by global warming, expansion of influence on purchasing by millennial and subsequent generations having high environmental awareness, awareness of animal protection, health problems such as cholesterol accumulation in a case of using an animal protein, and prevention of infectious diseases, a trend of adopting plant milk such as soymilk as a substitute for milk has been expanding mainly in the millennial and subsequent generations.

Along with the flow described above, plant milk has been used for wide application, and is increasingly used for cooking application such as hot pot dishes in addition to beverage application. However, when plant milk, particularly vegetable milk typified by soymilk, is used for cooking application, it reacts with a salt or a mineral to form aggregates. This is not preferable in appearance.

On the other hand, as a method for suppressing aggregation, for example, a method for suppressing aggregation by performing homogenization treatment, a method for suppressing aggregation by selecting a soybean protein material in which a specific component is reduced, a method for adjusting a pH, and the like are disclosed. (Patent Documents 1 and 2)

PRIOR ART DOCUMENTS

Patent Documents

Patent Document 1: JP S59-227261 A
Patent Document 2: JP 2015-33344 A

DISCLOSURE OF THE INVENTION

Technical Problem

In a method in the related art for suppressing occurrence of aggregates at the time of heating in eating by subjecting a liquid food product including soymilk and a salt-containing seasoning as a base material to heat treatment at a high temperature and then homogenization treatment to pulverize aggregates in advance, it is necessary to perform homogenization. Accordingly, it is difficult to add solid materials such as meat and vegetables and perform all the processing at once. (Patent Document 1) In the method for suppressing aggregation by selecting a specific soybean protein material in which a proportion of lipophilic protein is reduced, the soybean protein material is special and limitative. (Patent Document 2)

In addition to the above, in the method for suppressing aggregation by preliminarily adding a pH adjusting agent such as sodium bicarbonate to a liquid food product containing soybean protein before heating to adjust the pH to an alkaline side, there is a disadvantage that when a soybean protein concentration becomes high, an amount of the pH adjusting agent to be added also becomes large to impair flavor and color tone.

The present invention is to provide a vegetable-protein-containing liquid food product which contains a vegetable protein as a raw material and a salt-containing seasoning, does not aggregate even when heated, and is excellent in salt resistance.

Solution to Problem

As a result of intensive studies for solving the above problems, the present inventors have found that the problems described above can be solved by heat-sterilizing a mixture containing raw materials containing a vegetable protein such as soymilk, a salt-containing seasoning, and one or more emulsifiers selected from the group consisting of a polyglycerin fatty acid ester having an HLB of 7 or greater, a constituent fatty acid having 14 to 18 carbons, and a polymerization degree of 5 or greater, a polyglycerin fatty acid ester having an HLB of 12 or greater, a constituent fatty acid having 10 to 12 carbons, and a polymerization degree of 10 or greater, a sucrose fatty acid ester having an HLB of 5 or greater and a constituent fatty acid having 14 to 18 carbons, and a sorbitan fatty acid ester having an HLB of 15 or greater and a constituent fatty acid having 12 to 18 carbons, and have completed the present invention.

That is, the present invention relates to (1) a method for producing a vegetable-protein-containing liquid food product, the method including mixing raw materials containing a vegetable protein, a salt-containing seasoning, and one or more emulsifiers selected from the group consisting of (A) to (D), and then heat-sterilizing the mixture:

(A) a polyglycerin fatty acid ester having an HLB of 7 or greater, a constituent fatty acid having 14 to 18 carbons, and a polymerization degree of 5 or greater;

(B) a polyglycerin fatty acid ester having an HLB of 12 or greater, a constituent fatty acid having 10 to 12 carbons, and a polymerization degree of 10 or greater;

(C) a sucrose fatty acid ester having an HLB of 5 or greater and a constituent fatty acid having 14 to 18 carbons; and (D) a sorbitan fatty acid ester having an HLB of 15 or greater and a constituent fatty acid having 12 to 18 carbons, (2) the method for producing a vegetable-protein-containing liquid food product according to (1), in which, in the vegetable-protein-containing liquid food product, a content of the vegetable protein is 0.1 to 10 wt. %, and a content of the emulsifier is 7 wt. % or greater per vegetable protein, and (3) a vegetable-protein-containing liquid food product containing a heat-sterilized product of a mixture containing a vegetable protein, a salt-containing seasoning, and one or more emulsifiers selected from the group consisting of the (A) to (D):

(A) a polyglycerin fatty acid ester having an HLB of 7 or greater, a constituent fatty acid having 14 to 18 carbons, and a polymerization degree of 5 or greater;

(B) a polyglycerin fatty acid ester having an HLB of 12 or greater, a constituent fatty acid having 10 to 12 carbons, and a polymerization degree of 10 or greater;

(C) a sucrose fatty acid ester having an HLB of 5 or greater and a constituent fatty acid having 14 to 18 carbons; and (D) a sorbitan fatty acid ester having an HLB of 15 or greater and a constituent fatty acid having 12 to 18 carbons.

Advantageous Effects of Invention

According to the present invention, it is possible to provide a vegetable-protein-containing liquid food product having good flavor and containing a salt-containing seasoning, in which aggregation is hardly caused by heat treatment even though it contains an alkali metal ion such as sodium contained in dietary salt.

DESCRIPTION OF EMBODIMENTS

A vegetable-protein-containing liquid food product according to the present invention contains a heat-sterilized product of a mixture containing: a vegetable protein; a salt-containing seasoning; and one or more emulsifiers selected from the group consisting of a polyglycerin fatty acid ester having an HLB of 7 or greater, a constituent fatty acid having 14 to 18 carbons, and a polymerization degree of 5 or greater, a polyglycerin fatty acid ester having an HLB of 12 or greater, a constituent fatty acid having 10 to 12 carbons, and a polymerization degree of 10 or greater, a sucrose fatty acid ester having an HLB of 5 or greater and a constituent fatty acid having 14 to 18 carbons, and a sorbitan fatty acid ester having an HLB of 15 or greater and a constituent fatty acid having 12 to 18 carbons. The present invention will be described in detail below.

Vegetable-Protein-Containing Liquid Food Product

The vegetable-protein-containing liquid food product according to the present invention is a liquid food product containing a vegetable protein and a salt-containing seasoning, and examples thereof include bases of soup, stew, hot pot dishes, and the like, stock soup, and sauce.

Vegetable Protein

The vegetable-protein-containing liquid food product according to the present invention contains at least a vegetable protein as a protein. For the raw material containing the vegetable protein, a powdery protein such as a concentrated protein or an isolated protein, a plant milk, a legume flour, or the like can be used. The type of the plant is not limited as long as the plant has a protein that forms a gel in response to a salt, for example, as globulin in a case of a soybean, and examples thereof include legumes represented by a soybean, a pea, a fava bean, and a chickpea; seeds represented by an almond, a hazelnut, a cashew nut, a walnut, a peanut, and a pistachio; and cereals represented by rice and oats. In addition, these can be mixed and used in appropriate proportions.

A content of the vegetable protein in the vegetable-protein-containing liquid food product is not particularly limited, but is preferably 0.1 to 10 wt. %, more preferably 0.3 to 5 wt. %, and still more preferably 0.5 to 3 wt. %.

Plant Milk

In a case where plant milk which is milk (milky liquid) produced by using a plant raw material as a basic raw material is used, not only one produced by removing an insoluble fraction (soy pulp) from the plant milk but also one in a slurry form produced by pulverizing an insoluble fraction (soy pulp) without removing the insoluble fraction (soy pulp) from the plant milk can be used.

For example, in a case of soybeans, a typical soymilk can be used which is produced through water extraction from whole soybeans or defatted soybeans, and removal of soy pulp as insoluble fibers. At that time, to produce soymilk with better flavor, an improved production method can be appropriately applied.

As another example, a soybean slurry produced by dissolving soybean powder in water can also be used.

Emulsifier

A polyglycerin fatty acid ester having an HLB of 7 or greater, a constituent fatty acid having 14 to 18 carbons, and a polymerization degree of 5 or greater, a polyglycerin fatty acid ester having an HLB of 12 or greater, a constituent fatty acid having 10 to 12 carbons, and a polymerization degree of 10 or greater, a sucrose fatty acid ester having an HLB of 5 or greater and a constituent fatty acid having 14 to 18 carbons, or a sorbitan fatty acid ester having an HLB of 15 or greater and a constituent fatty acid having 12 to 18 carbons can be used as the emulsifier in the present invention. One or more of these emulsifiers can be used in combination.

An addition amount of the emulsifier is 7 wt. % or greater, more preferably 8 wt. % or greater, preferably 10 to 60 wt. %, and further preferably 12 to 50 wt. %, with respect to the content of the vegetable protein. In a case where a proportion of the emulsifier to the vegetable protein is low, the effect of suppressing aggregation during heat sterilization cannot be achieved, whereas in a case where the proportion of the emulsifier is high, the effect of suppressing aggregation during heat sterilization is not problematic, but the flavor may be affected.

Polyglycerin Fatty Acid Ester

One aspect of the polyglycerin fatty acid ester used in the present invention has a constituent fatty acid having 14 to 18 carbons, an HLB of 7 or greater, and a polymerization degree of 5 or greater. As the constituent fatty acid, a saturated or unsaturated fatty acid, and a linear or branched fatty acid are included, and examples thereof include myristic acid, oleic acid, and stearic acid. Examples of these polyglycerin fatty acid esters include decaglycerin monomyristate, pentaglycerin monooleate, hexaglycerin monooleate, decaglycerin monooleate, pentaglycerin monostearate, hexaglycerin monostearate, and decaglycerin monostearate.

In another aspect, the polyglycerin fatty acid ester has a constituent fatty acid having 10 to 12 carbons, an HLB of 10 or greater, and a polymerization degree of 12 or greater. Examples of the constituent fatty acid include caprylic acid and lauric acid. Examples of these polyglycerin fatty acid esters include decaglycerin monocaprylate and decaglycerin monolaurate.

Among the polyglycerin fatty acid esters, stearic acid and myristic acid are preferable as the constituent fatty acid from the viewpoint of imparting excellent salt resistance.

Sucrose Fatty Acid Ester

The sucrose fatty acid ester used in the present invention has an HLB of 5 or greater, preferably an HLB of 10 or greater, and a constituent fatty acid having 14 to 18 carbons. As the constituent fatty acid, a saturated or unsaturated fatty acid and a linear or branched fatty acid are included, and examples thereof include myristic acid, palmitic acid, oleic acid, and stearic acid.

Among the sucrose fatty acid esters, stearic acid and palmitic acid are preferable as the constituent fatty acid from the viewpoint of imparting excellent salt resistance.

Sorbitan Fatty Acid Ester

The sorbitan fatty acid ester used in the present invention has an HLB of 15 or greater and a constituent fatty acid having 12 to 18 carbons. As the constituent fatty acid, a saturated or unsaturated fatty acid, and a linear or branched fatty acid are included, and examples thereof include lauric acid, oleic acid, and stearic acid.

Chelating Agent

A chelating agent can be added to the vegetable-protein-containing liquid food product of the present invention. The chelating agent used in the present invention is a non-metal ligand that binds to a metal ion in a solution, and is not particularly limited as long as it binds to one metal ion by a plurality of coordination atoms in a ligand molecule and reduces the activity of the metal ion. Examples thereof include sodium citrate, sodium succinate, sodium tartrate, sodium gluconate, and phytic acid.

A blending amount of the chelating agent in the vegetable-protein-containing liquid food product is not particularly limited, but is preferably 0.1 to 1 wt. %, more preferably 0.1 to 0.7 wt. %, and still more preferably 0.1 to 0.5 wt. %. When the blending amount of the chelating agent is 0.1 wt. % or greater, suppression of aggregation may be further improved. On the other hand, when the blending amount of the chelating agent is high, the flavor may be affected.

Salt-Containing Seasoning

The salt-containing seasoning used in the present invention is not particularly limited as long as it is a seasoning containing an alkali metal represented by sodium and potassium. Examples thereof include dietary salt, animal meat extract, fish meat extract, soy sauce, and sauce. These salt-containing seasonings can be appropriately used depending on desired flavor of the vegetable-protein-containing liquid food product.

A content of sodium contained in the vegetable-protein-containing liquid food product is preferably 0.5 wt. % or greater, and more preferably 0.8 wt. % or greater in terms of dietary salt equivalent. In a case where the content of sodium is low, it is less likely to achieve desired flavor.

The vegetable-protein-containing liquid food product may contain an auxiliary raw material in addition to the vegetable protein material and the salt-containing seasoning. As the auxiliary raw material, animal protein food products such as animal meat and fish meat, dairy products, mushrooms, and vegetables such as onion, carrot, cabbage, tomato, celery, spinach, corn, potato, and pumpkin can be appropriately contained singly or in any combination. They may be added in a form of a ground product, a squeezed liquid, or the like. The auxiliary material includes seasonings other than the salt-containing seasoning described above (these are simply referred to as "seasonings" in the present specification), and examples thereof include sugar and seasoning liquor. Further, a lipid, various gums, a stabilizer, a flavoring agent, a spice, a coloring agent, a pH adjusting agent, or the like can be appropriately used as the auxiliary raw material.

Heat Sterilization

A method for producing the vegetable-protein-containing liquid food product includes: mixing a vegetable protein material, a salt-containing seasoning, and other auxiliary materials; and heating the mixture at a high temperature required for sterilization (hereinafter referred to as "heat sterilization"). As needed, cooking may be carried out before heat sterilization. The raw materials may be mixed in any order, and even in a case where cooking is performed before heat sterilization, the raw materials may be mixed at any timing. For example, all the raw materials may be mixed and then cooked, or the raw materials other than the vegetable protein material may be mixed and cooked, and then the vegetable protein material may be added thereto. It is also possible to simply mix the raw materials to prepare a liquid material, and to perform cooking by subsequent heat sterilization. Furthermore, the raw material mixture may be homogenized by pulverization or straining in advance to prevent clogging of a heat exchanger or a homogenizer with the raw material mixture during heat sterilization.

As needed, the pH is preferably adjusted to 7.0 or greater, more preferably 7.2 or greater, and even more preferably 7.4 or greater in advance before cooking including heat sterilization. When the pH is adjusted to the alkaline side, it is possible to further suppress aggregation due to heating.

For the heat sterilization, apparatuses known in the related art can be used, for example, various heat exchangers such as a plate-type heat exchanger, a tube-type heat exchanger, a scraping-type heat exchanger and a steam injection-type heat exchanger, and a batch-type retort kettle. These apparatuses may be used in any combination. Heat sterilization conditions are not particularly limited. For example, in a case of enhancing preservability of the vegetable-protein-containing liquid food product, a temperature is preferably 80 to 160° C., and further preferably 110 to 150° C. A heating time is preferably 1 second to 60 minutes, and further preferably 3 seconds to 40 minutes.

As needed, the heat-sterilized vegetable-protein-containing liquid food product may be subjected to deaeration treatment.

The vegetable-protein-containing liquid food product produced by the method of the present invention can be mixed with a base of a hot pot dish, stock soup, or the like commercially available for cooking, and used for various processing cooking. After mixing, aggregation hardly occurs at the time of cooking, and good flavor is exhibited.

EXAMPLES

Examples will be described below, but the technical idea of the present invention is not limited to these examples. Note that hereinafter, "%" and "part(s)" are based on weight unless otherwise specified.

Examples 1 and 2, Comparative Examples 1 and 2: Effect of Emulsifier

Soymilk cream (Fuji Oil Co., Ltd., protein 6.1 g (calculated with a protein conversion factor of 5.71), lipid 12.3 g, carbohydrate 0.6 g, sodium 1 mg, potassium 147 mg), sucrose fatty acid ester ("RYOTO Sugar Ester S-1670" (Mitsubishi Chemical Foods)), tri sodium citrate, and water were mixed at 60° C. as shown in Table 1, and the mixture was cooled to 10° C. After cooling, addition was performed in such a manner that a final concentration of dietary salt was 1.5%, and the mixture was sealed in a retort pouch and heat-sterilized at 122° C. for 30 minutes at a high temperature and a high pressure to prepare a vegetable-protein-containing liquid food product.

Presence or absence of aggregation was evaluated as follows by (1) visual observation and (2) particle size measurement.

(1) Visual observation: "○" was given when there was no aggregation, and "X" was given when there was aggregation.

(2) Measurement of particle size: a particle size was measured by dispersing a small amount of the vegetable-protein-containing liquid food product in water and measuring the particle size at 25° C. with a particle size analyzer ("SALD-700" available from Shimadzu Corporation) using a laser diffraction/light scattering method. [Unit: μm]

A particle size of less than 10.0 μm was determined to be acceptable. Further, in the acceptable range, less than 2.0 μm was evaluated as "4", 2.0 to less than 5.0 μm was evaluated as "3", and 5.0 to less than 10.0 μm was evaluated as "2". Those having a thickness of 10.0 μm or greater were evaluated as "1".

The final evaluation was carried out by total evaluation of the visual observation and the particle size, and (visual observation: ○ and particle size evaluation: 2 or greater) was judged to be acceptable, and (visual observation: X or particle size evaluation: 1) was judged to be unacceptable.

TABLE 1

Effect of emulsifier

| | Example 1 | Example 2 | Comparative Example 1 | Comparative Example 2 |
|---|---|---|---|---|
| Soymilk cream | 20 parts | 20 parts | 20 parts | 20 parts |
| RYOTO Sugar Ester S-1670 | 0.55 parts | 0.55 parts | | |
| Trisodium citrate | | 0.5 parts | | |
| Dietary salt | 1.5 parts | 1.5 parts | 1.5 parts | 0.8 parts |
| Water | 77.95 parts | 77.45 parts | 78.50 parts | 79.20 parts |
| Visual observation | ○ | ○ | X | X |
| Particle size | 3 | 4 | 1 | 1 |
| Final evaluation | Acceptable | Acceptable | Unacceptable | Unacceptable |

Regardless of whether or not a chelating agent was added, the effect of suppressing aggregation during heating was exhibited. In addition, Example 2, in which a chelating agent was added, exhibited the effect of suppressing aggregation during heat sterilization more.

(Examples 2 to 26 and Comparative Examples 3 to 19) Effects of Emulsifiers 20 parts of soymilk cream (Fuji Oil Co., Ltd., protein 6.1 g (calculated with a protein conversion factor of 5.71), lipid 12.3 g, carbohydrate 0.6 g, sodium 1 mg, potassium 147 mg), 0.55 parts of the emulsifier, 0.5 parts of trisodium citrate, and 77.45 parts of water were mixed at 60° C. and the mixture was cooled to 10° C. After cooling, addition was performed in such a manner that a final concentration of dietary salt was 1.5%, and the mixture was sealed in a retort pouch and heat-sterilized at 122° C. for 30 minutes at a high temperature and a high pressure to prepare a vegetable-protein-containing liquid food product.

Presence or absence of aggregation was evaluated by (1) visual observation and (2) particle size measurement in the same manner as in Example 1.

The results of studies on a sucrose fatty acid ester, polyglycerin fatty acid esters, an organic acid monoglycerin fatty acid ester, and a sorbitan fatty acid ester are shown in Tables 2 to 7, respectively.

TABLE 2

Comparison of sucrose fatty acid esters

| | Emulsifier | Manufacturer | Component | HLB | Visual observation | Particle size | Final evaluation |
|---|---|---|---|---|---|---|---|
| Example 2 | RYOTO Sugar Ester S-1670 | Mitsubishi Chemical Foods | Sucrose stearate | 16.0 | ○ | 4 | Acceptable |
| Example 3 | RYOTO Sugar Ester S-1170 | Mitsubishi Chemical Foods | Sucrose stearate | 11.0 | ○ | 4 | Acceptable |
| Example 4 | RYOTO Sugar Ester S-570 | Mitsubishi Chemical Foods | Sucrose stearate | 5.0 | ○ | 3 | Acceptable |
| Example 5 | RYOTO Sugar Ester M-1695 | Mitsubishi Chemical Foods | Sucrose myristate | 16.0 | ○ | 3 | Acceptable |
| Example 6 | RYOTO Sugar Ester P-1670 | Mitsubishi Chemical Foods | Sucrose palmitate | 16.0 | ○ | 3 | Acceptable |
| Example 7 | RYOTO Sugar Ester O-1570 | Mitsubishi Chemical Foods | Sucrose oleate | 15.0 | ○ | 4 | Acceptable |
| Comparative Example 3 | RYOTO Sugar Ester L-1695 | Mitsubishi Chemical Foods | Sucrose laurate | 16.0 | X | 1 | Unacceptable |

From the results shown in Table 3, sucrose fatty acid esters each having an HLB of 5 or greater and a constituent fatty acid having 14 to 18 carbons exhibited the effect of suppressing aggregation during heat sterilization.

TABLE 3

Comparison of polyglycerin fatty acid esters (in a case where a constituent fatty acid has 14 to 18 carbons)

| | Emulsifier | Manufacturer | Component | HLB | Visual observation | Particle size | Final evaluation |
|---|---|---|---|---|---|---|---|
| Example 8 | SUNSOFT A-181E | Taiyo Kagaku Co., Ltd. | Pentaglycerin monostearate | 13.0 | ○ | 4 | Acceptable |
| Example 9 | SY Glyster TS-5S | Sakamoto Yakuhin Kogyo Co., Ltd. | Hexaglycerin tristearate | 7.4 | ○ | 3 | Acceptable |
| Example 10 | SY Glyster MS-5S | Sakamoto Yakuhin Kogyo Co., Ltd. | Hexaglycerin monostearate | 11.6 | ○ | 2 | Acceptable |
| Example 11 | SY Glyster TS-7S | Sakamoto Yakuhin Kogyo Co., Ltd. | Decaglycerin tristearate | 10.0 | ○ | 3 | Acceptable |
| Example 12 | RYOTO Polyglyester SWA-20D | Mitsubishi Chemical Foods | Decaglycerin stearate | 11.0 | ○ | 4 | Acceptable |
| Example 13 | POEM J-0081HV | Riken Vitamin Co., Ltd. | Decaglycerin stearate | 12.0 | ○ | 4 | Acceptable |
| Example 14 | SY Glyster MSW-7S | Sakamoto Yakuhin Kogyo Co., Ltd. | Decaglycerin monostearate | 13.4 | ○ | 4 | Acceptable |
| Example 15 | SUNSOFT A-173E | Taiyo Kagaku Co., Ltd. | Pentaglycerin trioleate | 7.0 | ○ | 2 | Acceptable |
| Example 16 | SUNSOFT A-171E | Taiyo Kagaku Co., Ltd. | Pentaglycerin monooleate | 13.0 | ○ | 4 | Acceptable |
| Example 17 | SY Glyster MO-5S | Sakamoto Yakuhin Kogyo Co., Ltd. | Hexaglycerin monooleate | 11.6 | ○ | 3 | Acceptable |
| Example 18 | SUNSOFT Q-17S | Taiyo Kagaku Co., Ltd. | Decaglycerin monooleate | 12.0 | ○ | 4 | Acceptable |
| Example 19 | RYOTO Polyglyester O-15D | Mitsubishi Chemical Foods | Decaglycerin oleate | 13.0 | ○ | 4 | Acceptable |
| Example 20 | SUNSOFT A-143E | Taiyo Kagaku Co., Ltd | Pentaglycerin trimyristate | 8.0 | ○ | 3 | Acceptable |
| Example 21 | SUNSOFT A-141E | Taiyo Kagaku Co., Ltd. | Pentaglycerin monomyristate | 13.0 | ○ | 4 | Acceptable |
| Example 22 | SY Glyster MM-750 | Sakamoto Yakuhin Kogyo Co., Ltd. | Decaglycerin monomyristate | 15.7 | ○ | 4 | Acceptable |
| Comparative Example 4 | SUNSOFT Q-18B | Taiyo Kagaku Co., Ltd. | Diglycerin monodistearate | 6.5 | X | 1 | Unacceptable |
| Comparative Example 5 | POEM DS-100A | Riken Vitamin Co., Ltd. | Diglycerin monostearate | 7.4 | X | 1 | Unacceptable |
| Comparative Example 6 | SY Glyster MS-3S | Sakamoto Yakuhin Kogyo Co., Ltd. | Tetraglycerin monostearate | 8.4 | X | 1 | Unacceptable |
| Comparative Example 7 | SUNSOFT Q-17B | Taiyo Kagaku Co., Ltd | Diglycerin monodioleate | 6.5 | X | 1 | Unacceptable |
| Comparative Example 8 | SY Glyster MO-3S | Sakamoto Yakuhin Kogyo Co., Ltd. | Tetraglycerin monooleate | 8.8 | X | 1 | Unacceptable |

From the results shown in Table 3, the polyglycerin fatty acid esters each having a constituent fatty acid having 14 to 18 carbons, an HLB of 7 or greater, and a polymerization degree of 5 or greater exhibited the effect of suppressing aggregation during heat sterilization.

TABLE 4

Comparison of polyglycerin fatty acid esters (in a case where a constituent fatty acid has 10 to 12 carbons)

| | Emulsifier | Manufacturer | Component | HLB | Visual observation | Particle size | Final evaluation |
|---|---|---|---|---|---|---|---|
| Example 23 | SY Glyster MCA-750 | Sakamoto Yakuhin Kogyo Co., Ltd. | Decaglycerin monocaprylate | 16.1 | ○ | 4 | Acceptable |
| Example 24 | SY Glyster ML-750 | Sakamoto Yakuhin Kogyo Co., Ltd. | Decaglycerin monolaurate | 14.7 | ○ | 4 | Acceptable |
| Comparative Example 9 | SY Glyster MCA-150 | Sakamoto Yakuhin Kogyo Co., Ltd. | Diglycerin monocaprylate | 8.7 | X | 1 | Unacceptable |
| Comparative Example 10 | SUNSOFT A-121E | Taiyo Kagaku Co., Ltd. | Pentaglycerin monolaurate | 14.0 | X | 1 | Unacceptable |

TABLE 4-continued

| Comparison of polyglycerin fatty acid esters (in a case where a constituent fatty acid has 10 to 12 carbons) | | | | | | | |
|---|---|---|---|---|---|---|---|
| | Emulsifier | Manufacturer | Component | HLB | Visual observation | Particle size | Final evaluation |
| Comparative Example 11 | SY Glyster ML-500 | Sakamoto Yakuhin Kogyo Co., Ltd. | Hexaglycerin monolaurate | 13.4 | ○ | 1 | Unacceptable |

From the results shown in Table 4, the polyglycerin fatty acid esters each having a constituent fatty acid having 10 to 12 carbons, an HLB of 12 or greater, and a polymerization degree of 10 or greater exhibited the effect of suppressing aggregation during heat sterilization.

TABLE 5

| Comparison of organic acid monoglycerin fatty acid esters | | | | | | | |
|---|---|---|---|---|---|---|---|
| | Emulsifier | Manufacturer | Component | HLB | Visual observation | Particle size | Final evaluation |
| Comparative Example 12 | SUNSOFT No. 621B | Taiyo Kagaku Co., Ltd. | Glycerin monostearate citrate | 9.5 | X | 1 | Unacceptable |
| Comparative Example 13 | SUNSOFT No. 623M | Taiyo Kagaku Co., Ltd. | Glycerin monooleate citrate | 7.0 | X | 1 | Unacceptable |
| Comparative Example 14 | SUNSOFT 641D | Taiyo Kagaku Co., Ltd. | Diacetyltartaric acid glycerin monostearate | 9.0 | X | 1 | Unacceptable |
| Comparative Example 15 | SUNSOFT 681NU | Taiyo Kagaku Co., Ltd. | Glycerin monostearate succinate | 8.5 | X | 1 | Unacceptable |
| Comparative Example 16 | SUNSOFT no. 661AS | Taiyo Kagaku Co., Ltd. | Glycerin monostearate lactate | 7.5 | X | 1 | Unacceptable |
| Comparative Example 17 | POEM B-10 | Riken Vitamin Co., Ltd. | Glycerin monostearate succinate | 5.5 | X | 1 | Unacceptable |

From the results shown in Table 5, the organic acid monoglycerin fatty acid esters did not exhibit the effect of suppressing aggregation during heat sterilization.

TABLE 6

| Comparison of sorbitan fatty acid esters | | | | | | | |
|---|---|---|---|---|---|---|---|
| | Emulsifier | Manufacturer | Component | HLB | Visual observation | Particle size | Final evaluation |
| Example 25 | WILSURF 60 | NOF Corporation | Sorbitan monostearate | 15.7 | ○ | 2 | Acceptable |
| Example 26 | WILSURF 80 | NOF Corporation | Sorbitan monooleate | 15.7 | ○ | 3 | Acceptable |
| Comparative Example 18 | POEM O-80V | Riken Vitamin Co., Ltd. | Sorbitan monooleate | 4.9 | X | 1 | Unacceptable |

From the results shown in Table 6, the sorbitan fatty acid esters each having an HLB of 15 or greater and a constituent fatty acid having 12 to 18 carbons exhibited the effect of suppressing aggregation during heat sterilization.

TABLE 7

| Comparison of lecithin | | | | | | | |
|---|---|---|---|---|---|---|---|
| | Emulsifier | Manufacturer | Component | HLB | Visual observation | Particle size | Final evaluation |
| Comparative Example 19 | SUNLECITHIN A-1 | Taiyo Kagaku Co., Ltd. | Enzymatically decomposed soy lecithin | — | X | 1 | Unacceptable |

From the results shown in Table 7, lecithin did not exhibit the effect of suppressing aggregation during heat sterilization.

Examples 27 to 30: Addition Amount of Emulsifier

According to Table 8, soymilk cream (Fuji Oil Co., Ltd., protein 6.1 g (calculated with a protein conversion factor of 5.71), lipid 12.3 g, carbohydrate 0.6 g, sodium 1 mg, potassium 147 mg), sucrose fatty acid ester ("RYOTO Sugar Ester S-1670" (Mitsubishi Chemical Foods)), trisodium citrate, and water were mixed at 60° C. and the mixture was cooled to 10° C. After cooling, addition was performed in such a manner that a final concentration of dietary salt was 1.5%, and the mixture was sealed in a retort pouch and heat-sterilized at 122° C. for 30 minutes at a high temperature and a high pressure to prepare a vegetable-protein-containing liquid food product.

Presence or absence of aggregation was evaluated by (1) visual observation and (2) particle size measurement in the same manner as in Example 1.

TABLE 8

Comparison of addition amounts of emulsifier

| | Example 2 | Example 27 | Example 28 | Example 29 | Example 30 | Comparative Example 20 |
|---|---|---|---|---|---|---|
| Soymilk cream | 20 parts | 20 parts | 20 parts | 20 parts | 20 parts | 20 parts |
| RYOTO Sugar Ester S-1670 | 0.55 parts | 0.3 parts | 0.2 parts | 0.15 parts | 0.1 parts | 0.05 parts |
| Trisodium citrate | 0.5 parts | 0.5 parts | 0.5 parts | 0.5 parts | 0.5 parts | 0.5 parts |
| Dietary salt | 1.5 parts | 1.5 parts | 1.5 parts | 1.5 parts | 1.5 parts | 1.5 parts |
| Water | 77.45 parts | 77.70 parts | 77.80 parts | 77.85 parts | 77.90 parts | 77.95 parts |
| Proportion of emulsifier per vegetable protein | 45.1% | 24.6% | 16.4% | 12.3% | 8.2% | 4.1% |
| Visual observation | ○ | ○ | ○ | ○ | ○ | X |
| Particle size | 4 | 4 | 4 | 4 | 4 | 1 |
| Final evaluation | Acceptable | Acceptable | Acceptable | Acceptable | Acceptable | Unacceptable |

From Table 8, Examples 27 to 30 exhibited the effect of suppressing aggregation during heat sterilization.

The invention claimed is:

1. A method for producing a vegetable-protein-containing liquid food product, the method comprising mixing raw materials containing a vegetable protein, a salt-containing seasoning, and one or more emulsifiers selected from the group consisting of (A) to (D), and then heat-sterilizing the mixture:

(A) a polyglycerin fatty acid ester having an HLB of 7 or greater, a constituent fatty acid having 14 to 18 carbons, and a polymerization degree of 5 or greater;

(B) a polyglycerin fatty acid ester having an HLB of 12 or greater, a constituent fatty acid having 10 to 12 carbons, and a polymerization degree of 10 or greater;

(C) a sucrose fatty acid esters having an HLB of 5 or greater and a constituent fatty acid having 14 to 18 carbons; and (D) a sorbitan fatty acid ester having an HLB of 15 or greater and a constituent fatty acid having 12 to 18 carbons, wherein a content of sodium contained in the vegetable-protein-containing liquid food product is 0.5 wt. % or greater in terms of dietary salt equivalent.

2. The method for producing a vegetable-protein-containing liquid food product according to claim 1, wherein, in the vegetable-protein-containing liquid food product, a content of the vegetable protein is 0.1 to 10 wt. %, and a content of the emulsifier is 7 wt. % or greater per vegetable protein.

3. A vegetable-protein-containing liquid food product containing a heat-sterilized product of a mixture containing a vegetable protein, a salt-containing seasoning, and one or more emulsifiers selected from the group consisting of (A) to (D):

(A) a polyglycerin fatty acid ester having an HLB of 7 or greater, a constituent fatty acid having 14 to 18 carbons, and a polymerization degree of 5 or greater;

(B) a polyglycerin fatty acid ester having an HLB of 12 or greater, a constituent fatty acid having 10 to 12 carbons, and a polymerization degree of 10 or greater;

(C) a sucrose fatty acid esters having an HLB of 5 or greater and a constituent fatty acid having 14 to 18 carbons; and (D) a sorbitan fatty acid ester having an HLB of 15 or greater and a constituent fatty acid having 12 to 18 carbons, wherein a content of sodium contained in the vegetable-protein-containing liquid food product is 0.5 wt. % or greater in terms of dietary salt equivalent.

* * * * *